(12) United States Patent
Ully et al.

(10) Patent No.: US 8,777,275 B2
(45) Date of Patent: Jul. 15, 2014

(54) FLUID TRANSFER CONNECTION DEVICE, CIRCUIT INCORPORATING IT AND ITS MOUNTING/DEMOUNTING

(75) Inventors: Stéphane Ully, Chalette sur Loing (FR); Denis Godeau, Vielles Maisons (FR)

(73) Assignee: Hutchinson, Paris (FR)

( * ) Notice: Subject to any disclaimer, the term of this patent is extended or adjusted under 35 U.S.C. 154(b) by 78 days.

(21) Appl. No.: 13/418,135

(22) Filed: Mar. 12, 2012

(65) Prior Publication Data
US 2012/0256414 A1 Oct. 11, 2012

(30) Foreign Application Priority Data

Mar. 15, 2011 (FR) ...................................... 11 52103

(51) Int. Cl.
*F16L 37/00* (2006.01)
(52) U.S. Cl.
USPC .......................................... 285/305; 285/319
(58) Field of Classification Search
USPC ............................... 285/305, 319, 81, 89, 313
See application file for complete search history.

(56) References Cited

U.S. PATENT DOCUMENTS

2008/0252071 A1* 10/2008 Lechner et al. ............... 285/319
2010/0225104 A1 9/2010 Ully et al.

FOREIGN PATENT DOCUMENTS

| DE | 10 2009 02847 | | 2/2011 |
|---|---|---|---|
| EP | 2 083 206 | A1 | 7/2009 |
| EP | 2 236 894 | A | 10/2010 |
| WO | WO 2007/042344 | A | 4/2007 |
| WO | WO 2011/018262 | A1 | 2/2011 |

OTHER PUBLICATIONS

Preliminary Search Report for Application No. FR 1152103 dated Dec. 13, 2011.

* cited by examiner

*Primary Examiner* — Aaron Dunwoody
(74) *Attorney, Agent, or Firm* — Alston & Bird LLP (57) ABSTRACT

A connection device including a tubular male termination, a connecting means adapted to be mounted around and accommodated in a groove of the female termination, and a locking member for locking these means in the female termination to be mounted around the male termination to reversibly move these means into a locking position in the groove. The device includes means for immobilizing and releasing the locking member that are rigidly fastened to the male termination, these means being adapted to prevent the connecting means from being moved to the locking position unless the male termination occupies a predetermined insertion position in the female termination and, only if the male termination has reached that position, to release the locking member, while allowing its movement toward the female termination so that a thrust on this member moves the connecting means into the locking position.

15 Claims, 9 Drawing Sheets

FLUID TRANSFER CONNECTION DEVICE, CIRCUIT INCORPORATING IT AND ITS MOUNTING/DEMOUNTING

FIELD OF THE INVENTION

The present invention concerns a connection device for a fluid transfer line, a fuel injector return circuit incorporating it, and a method for mounting/demounting this device in/from a tubular female termination to be connected to a male termination that the device comprises. The invention applies generally to all connections between such fluid transfer terminations, in particular low pressure terminations, and notably to fuel injection manifold for motor vehicles.

BACKGROUND

Generally speaking, it is known for fuel injection manifolds to use connection devices with a tubular male termination that fits in sealed manner inside a tubular female termination or "canula" by means of a flexible connecting member that is mounted on and fastened to the male termination and that may be locked at its axially interior end into a circumferential internal groove of the female termination under the control of a locking member cooperating with an axially exterior part of that connecting member.

There may be cited for example the document WO A 2007/042344 which describes a device of this kind in which the connecting member includes two diametrically opposite axial arms that are formed in one piece with the male termination and that are locked elastically into the groove of the female termination by bending them in the radial direction, opposing them being pulled out axially.

A major drawback of such a known connection device is that as soon as the male termination is locked into the female termination but the connecting member is not positioned in the connecting groove of the female termination it is no longer possible thereafter to move the connecting member into that groove.

The document EP A 2 236 894 in the name of the Applicant describes a connection device of another type including a locking member to be mounted around a male termination and the axially interior end of which is adapted to be connected to the groove of the female termination and is formed by connecting lugs that are elastically deformable when bent radially. Each of these lugs is adapted to be immobilized in a locking position against the groove, following a thrust applied to the locking member, via bending of the lugs in contact with guide and locking assistance ramps associated with those lugs that project radially on the male termination.

The connection device described in the latter document is entirely satisfactory because it meets the sealing and mechanical strength requirements specific to fuel injection manifolds in particular. These ramps and these associated lugs notably provide a "self-locking" function with the device in the locking position, thanks to the radial compression force exerted by the ramps on the lugs, pressing them into the groove, which force increases in proportion to the pressure of the fluid circulating in the male termination. This results in more secure functioning of the device even at high pressures.

SUMMARY

The Applicant has nevertheless sought to improve this device by adding an additional safety or double locking feature. A drawback of the above device is that its locking member may be lowered axially inward around the male termination in such a manner that its lugs are bent by the ramps of the male termination even if the latter is outside the female termination and that an operator does not know precisely when to lower this member around the male termination to immobilize the lugs in the groove of the female termination.

An object of the present invention is thus to propose a connection device for a fluid transfer line, in particular a low-pressure line, comprising:
a tubular male termination,
a connecting means configured to be mounted around the male termination while being connected to a tubular female termination by a radially internal face thereof, this means being configured to be accommodated in a connecting groove of this internal face, and
a locking member for locking the connecting means in the female termination, this member being adapted to be mounted around the male termination to reversibly move these means into a locking position in said groove.

To this end a device of the invention comprises means for immobilizing and releasing the locking member that are rigidly fastened to the male termination and are elastically deformable by bending in contact with an entry end of said internal face of the female termination, these immobilizing and release means being configured to prevent said connecting means from being moved to said locking position unless the male termination occupies a predetermined insertion position in the female termination and, only if the male termination has reached said insertion position, to release the locking member while allowing its movement toward the female termination so that a thrust on this member moves said connecting means into said locking position.

In the present description, the expressions "axially interior" or "axially inward" mean a location in the connected state relative to the axis of symmetry of the male and female terminations that is directed toward the interior of the connector, i.e. in a manner proximal to the connecting groove of the female termination; conversely, the expressions "axially exterior" or "axially outward" mean a location relative to that axis on the opposite (i.e. distal) side of that groove.

According to another feature of the invention, said immobilizing and release means may be retractable by elastic bending in the manner of lever arms in contact with said entry end of the female termination, these means being configured to occupy an immobilizing position in which the locking member abuts axially on these means which are deployed radially outward, and a release position in which this member is able to slide freely toward the female termination around these means that are retracted radially inward.

Said immobilizing and release means advantageously comprise a pair of arms formed in one piece with the male termination that extend symmetrically to each other with respect to the axis of the main termination from an axially internal area thereof, these arms, in said immobilizing position, being deployed on either side of this area at a same acute angle and, in said release position, being bent parallel to the axis of the male termination.

According to another feature of the invention, the locking member may include two internal rims or shoulders that are configured to abut on two free ends of said arms, respectively, deployed in their immobilizing position, and to lie radially outside the arms in said release position, these rims or shoulders being formed axially toward the exterior of an axially interior connecting end of said connecting means and being configured to lie axially outside the female termination in said locking position.

According to a further feature of the invention, each of said arms, of oblong blade shape, for example, has an external face relative to the male termination on which may be formed at least one projecting protuberance configured to cooperate with said entry end of the female termination when the male termination occupies said insertion position, said at least one protuberance preferably being formed substantially at the mid-height of the corresponding arm.

In an advantageous embodiment of the invention each of said arms has at least two of said protuberances in the form of parallel transverse ribs that are configured to cause these arms to close to obtain its release position and furthermore to emit, by rubbing in contact with said entry end of the female termination, a noise informing an operator that said insertion position of the male termination has been reached and therefore that said connecting means can be locked in said groove.

It will be noted that these arms forming said means for immobilizing and releasing the locking member may also serve to guide the male termination in circumferential translation in the female termination to facilitate centering of the connecting lugs at the entry to said groove.

According to a further feature of the invention, said connecting means may be formed in one piece with the locking member of which it forms an axially interior part, and this connecting means may include an axially interior connecting end comprising for example at least two connecting lugs elastically deformable in the radial direction extending axially inward and radially outward, the radially external and internal faces of each lug being able to be immobilized in said locking position by bending of each lug, respectively against said groove and against one of the corresponding guide and locking aid ramps of the male termination that are respectively associated with said lugs, said immobilizing and release means being configured to cooperate with the locking member independently of said ramps and lugs.

It will be noted that these connecting lugs and the associated guiding/immobilizing ramps may be as described in the aforementioned document EP A 2 236 894 in the name of the Applicant, for example. These lugs formed in one piece with the locking member have the advantage of low cost and easy assembly of the device compared to other known two-part devices and further contribute to imparting to the device improved mechanical strength against pulling out, as explained above.

According to a further feature of this embodiment of the invention using connecting lugs guided and immobilized in the groove of the female termination by ramps of the male termination, said arms are formed angularly between said ramps of which there are two and which are diametrically opposed for example, said at least one protuberance of each arm being formed axially outside each of the ramps.

According to a further feature of this embodiment of the invention using said lugs and ramps the locking member has said internal rims or shoulders that are formed angularly between these lugs and axially outside them, and said lugs, of which there are two for example, may each be of circular arc shape and the lugs being interconnected by as many notches configured to render these lugs sufficiently deformable in radial bending.

The locking member advantageously comprises holding means forming an axially exterior end of this member and that may have at least one radial plate configured to be pushed manually by an operator toward the female termination, and this member may cooperate with the male termination to give a visual indication that said locking position for said connecting means has been reached.

These holding means may for example be constituted of a single radial thrust plate that is removably mounted on an axially exterior and preferably discontinuous edge of the locking member and which, in said locking position, cooperates with an axial locking indicator pin extending between two bearing surfaces of the male termination so that this pin of the male termination is flush with the external face of said plate, which face is then axially level with and between these two bearing surfaces.

Alternatively, these means for holding the locking member may comprise two radial thrust plates that lie on respective opposite sides of a single bearing surface of the male termination, as in the member described in the aforementioned document EP A 2 236 894.

A fuel injector return circuit of the invention includes a tubular male termination connected to a tubular female termination by a connection device as defined hereinabove.

A method of mounting in a locking position and of demounting a connection device as defined above in a tubular female termination to be connected to a male termination of the device comprises the following successive mounting steps:

a) the connecting means and the locking member are positioned around the male termination in such a manner that the locking member abuts axially on said immobilizing and release means, which prevents axially inward movement of the connecting means, b) the male termination is inserted into the female termination to connect it thereto in said predetermined insertion position, which elastically bends these immobilizing and release means in contact with said entry end of the female termination so that the locking member no longer abuts on these means, which then allows axially inward movement of the connecting means, then c) an axially inward thrust is exerted on the locking member to move the connecting means into said locking position inside said groove of the female termination, and, for demounting the device, axially outward traction is exerted on the locking member whilst holding the male termination against the bottom of the female termination so as to extract the connecting means therefrom, after which the male termination is extracted from the female termination.

According to a further feature of the invention, in the step a) two internal rims or shoulders of the locking member, which are formed axially toward the exterior of said connecting means, are caused to abut against respective free ends of two retractable arms that form said immobilizing and release means, and then, in the step b), these arms may be retracted by bending them radially inward of said corresponding internal rims or shoulders to the contact of said entry end of the female termination, by rubbing at least one external protuberance situated substantially at mid-height of each arm against a chamfer of this entry end.

According to a further feature of the invention, in said locking position obtained after the step c), said internal rims or shoulders of the locking member are axially outside the female termination, and two diametrically opposite elastically deformable connecting lugs that form said connecting means may be immobilized by bending against said groove and against two corresponding guide and locking aid ramps of the male termination that are respectively associated with said lugs, which are angularly situated on either side of said arms.

BRIEF DESCRIPTION OF THE DRAWINGS

Other features, advantages and details of the present invention will emerge on reading the following description of one embodiment of the invention given by way of nonlimiting illustration, this description being given with reference to the appended drawings, in which.

DETAILED DESCRIPTION

Figure 1:
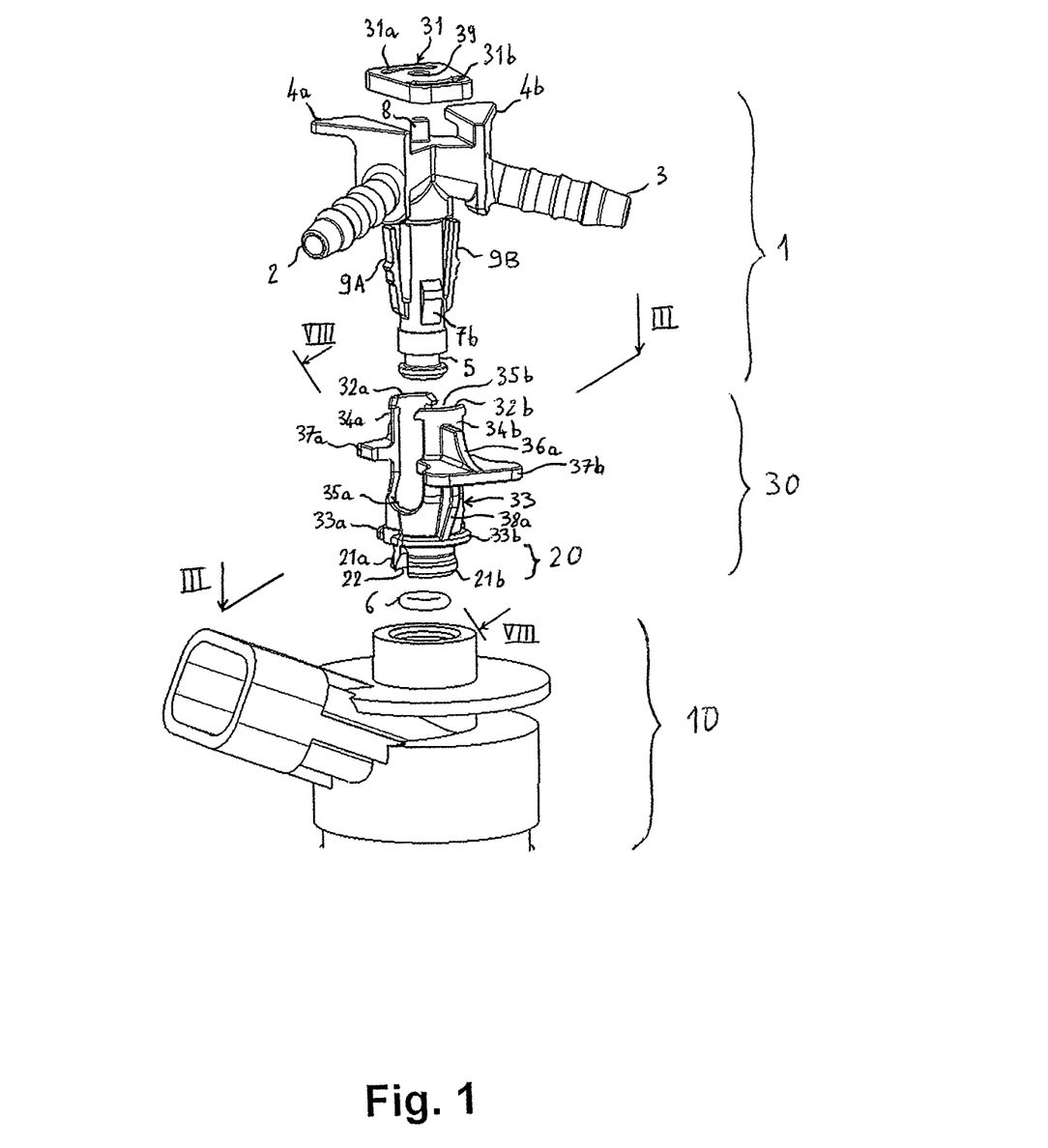
FIG. 1 is an exploded perspective view of a connection device of the invention intended to be mounted in a female termination (partially represented)

The tubular male termination 1 shown in FIG. 1 has, in known manner, at its axially exterior (i.e. upper) end, two branch connectors 2 and 3 in the form of spigots that extend symmetrically on either side of two bearing surfaces 4a, 4b for the operator provided on this termination 1 and, at its axially interior (i.e. lower) end, a circumferential groove 5 intended to receive an O-ring seal 6 mounted in or molded into this groove 5. Moreover, two ramps 7a, 7b are formed so as to project radially from a lower portion of the male termination 1 situated above the groove 5 in order to exert a guiding and locking aid function, as explained hereinafter.

Figure 3:
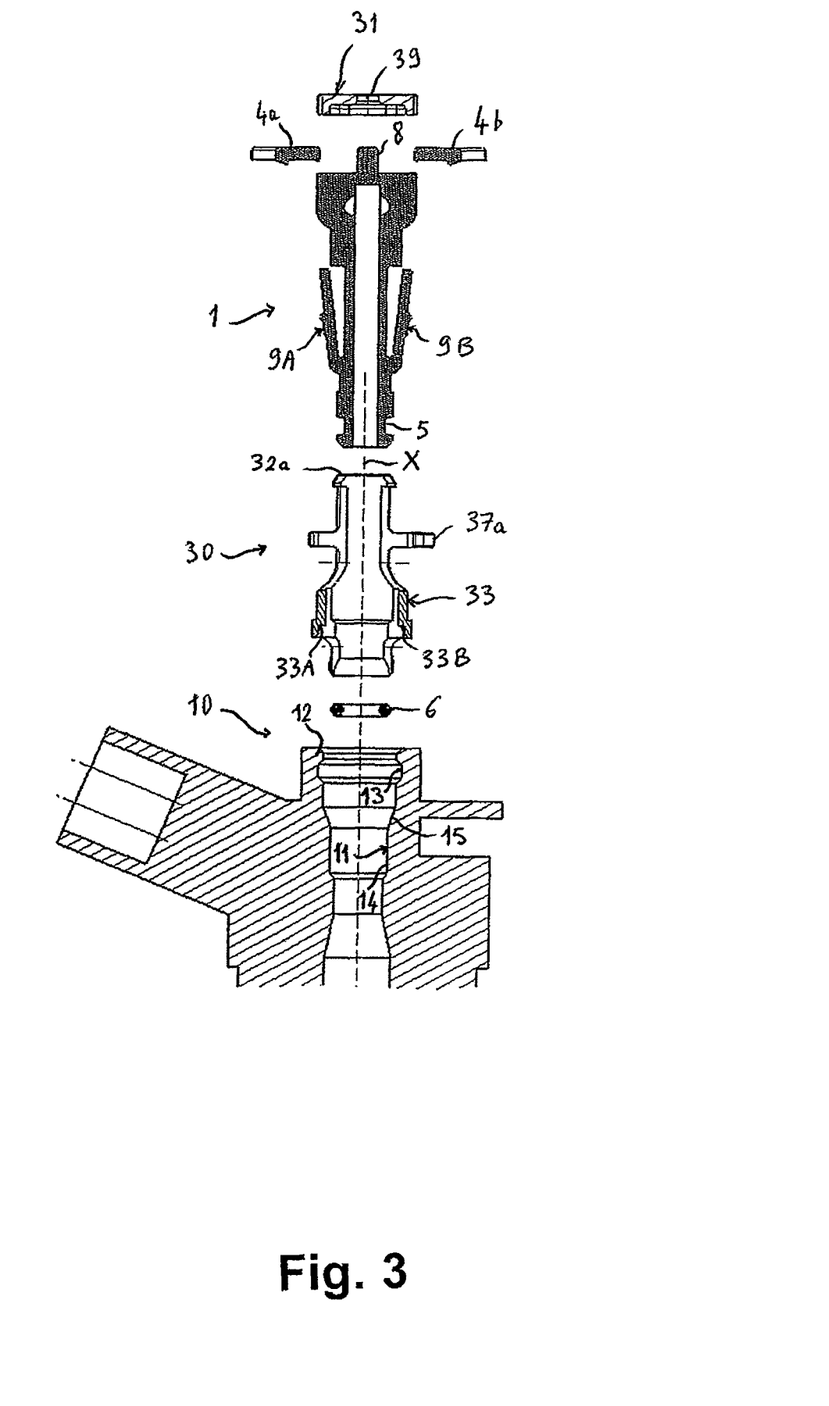
FIG. 3 is an exploded view in axial section of this device and this female termination taken along the line in FIG. 1.

The tubular female termination 10 (seen in particular in FIG. 3), of canula type and standard shape, essentially has on its radially internal face 11, in the immediate vicinity of its axially external (i.e. upper) entry end 12, a circumferential connecting groove 13 that is of substantially trapezoidal axial section and is intended to receive axially an interior connecting means 20 formed at a lower end of the device. The female termination 10 also has, in the immediate vicinity of its axially interior end, a circumferential sealing area 14 intended to receive the seal 6. In known manner, the internal section of the female termination 10 has a constriction 15 axially below the groove 13.

To be more precise, the connection end is formed by two lugs 21a, 21b of circular arc shape elastically deformable in radial bending (of which there are two in this embodiment, of lobe shape), that are included in a locking member 30 of the device, forming its lower end. This member 30 is produced in a plastic material of high mechanical strength, for example a polyamide, and in this embodiment essentially includes:

holding means 31 forming an upper end of the member 30 and constituted of a radial plate that is intended to be pushed manually by the operator toward the female termination 10 and that is removably mounted on two upper edge portions 32a, 32b of circular arc shape of a main body 33 of the member 30 via two corresponding openings 31a, 31b in the plate 31 receiving them, and the globally cylindrical main body 33, with its edge portions 32a, 32b that are extended downward by diametrically opposite cylindrical arcs 34a, 34b interconnected by two notches 35a, 35b in this embodiment, the two arcs 34a, 34b being respectively provided with two axial reinforcement lateral fins 36a supported by two radial rims 37a, 37b under which extend two axial lateral fins 38a, the body 33 terminating in the lugs 21a, 21b.

Figure 7:
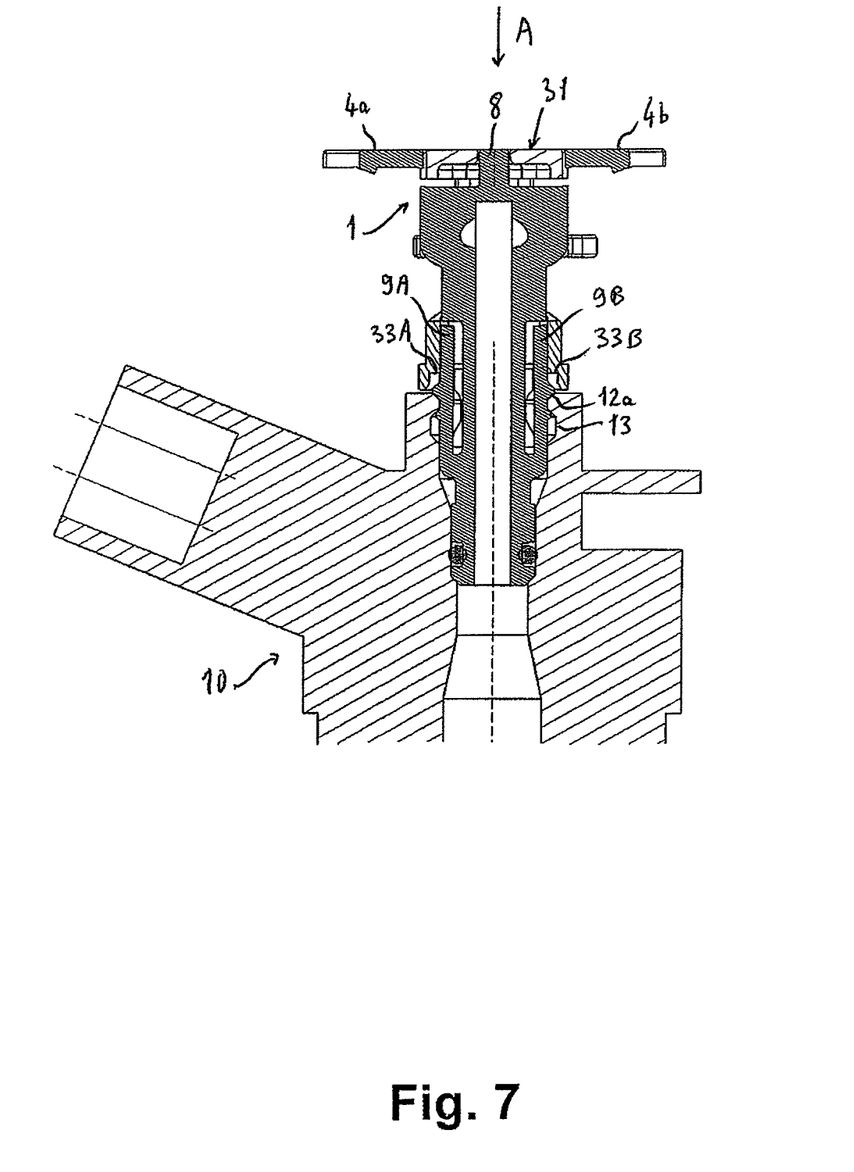
FIG. 7 is a view in axial section of the FIG. 6 device with the male termination completely inserted in the female termination, in a locking position of the locking member obtained following sliding thereof toward the female termination.

To be more precise, the holding plate 31 has an orifice 39 through it centered between the openings 31a, 31b which, when it is pushed axially by an operator toward the female termination in the direction of the arrow A to reach the locking position shown in FIG. 7, not only has its openings 31a, 31b filled by the underlying edge portions 32a, 32b but also the orifice 39 through which passes in flush manner an axial locking indicator pin 8 extending between the two bearing surfaces 4a, 4b of the male termination 1 so that the pin 8 is visibly flush with the external face of the plate 31 to indicate that the locking position has been reached (for example by virtue of a color of the termination 1 contrasting with that of the plate 31), this plate 31 then filling the depression 9 provided between the bearing surfaces 4a, 4b which are then at the same axial level as the plate 31.

Figure 8:
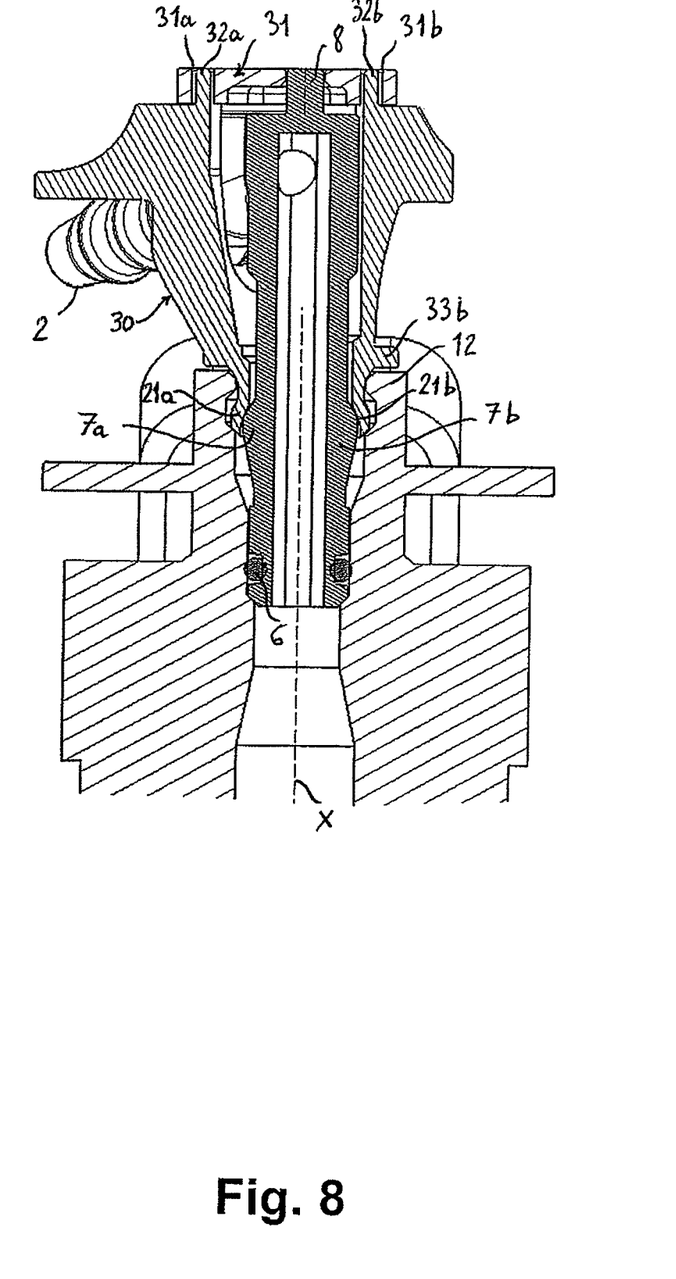
FIG. 8 is a view of the FIG. 7 device in axial section taken along the line VIII-VIII in FIG. 1, showing the connecting end of the locking member in the locking position.
Figure 9:
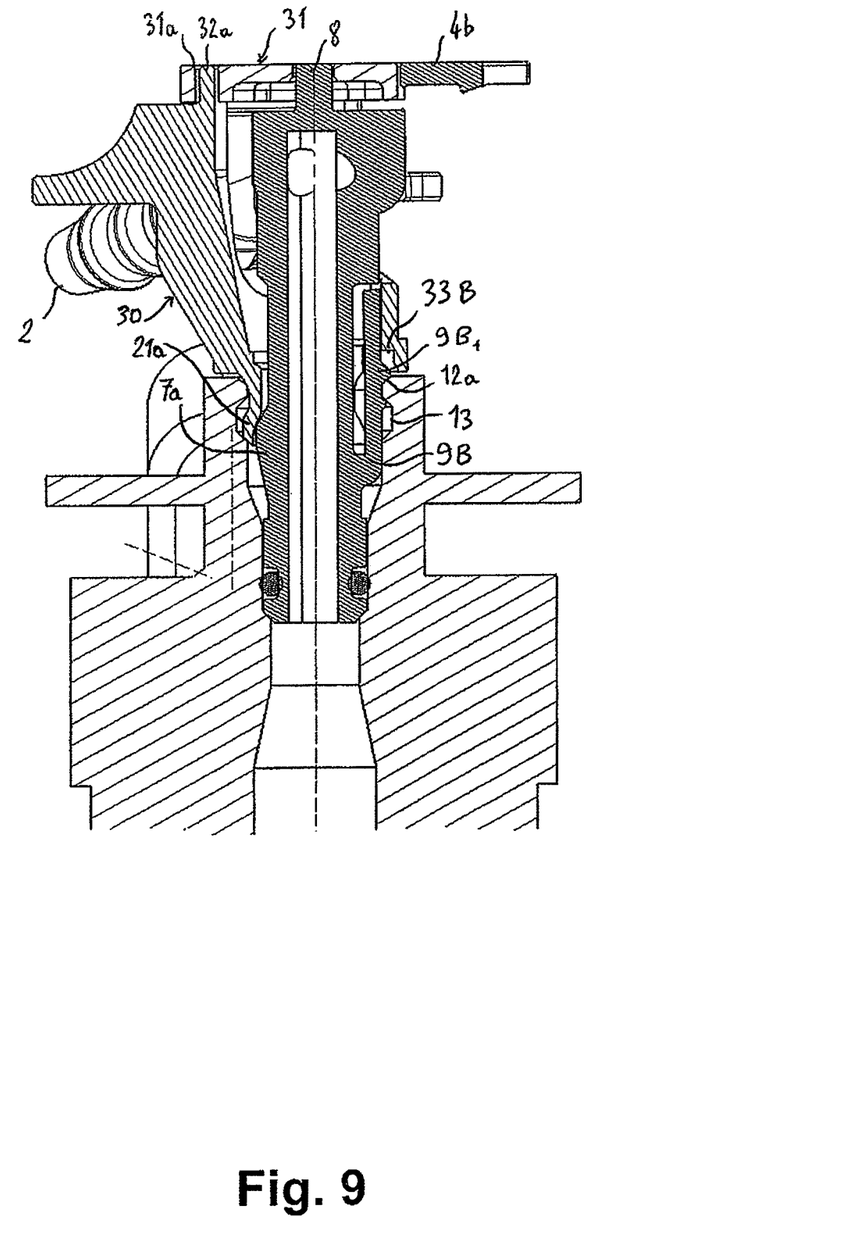
FIG. 9 is a view in axial section of the same device in this locking position, with the left-hand half of the locking device shown in the section plane of FIG. 8 and its right-hand half shown in the orthogonal section plane of FIG. 7.

As for the connecting lugs 21a, 21b, it is seen in FIGS. 8 and 9 that they extend downward under respective lower half-flanges 33a, 33b of the main body 33 situated below the notches 35a, 35b and that they are adapted to be immobilized in the locking position against the groove 13 by virtue of them being bent by the respective guide and locking aid ramps 7a, 7b. See the aforementioned document EP A1 2 236 894 for a precise description of the lugs 21a, 21b and the associated ramps 7a, 7b, it being merely pointed out here that the lugs 21a, 21b are rendered elastically deformable in radial bending by two notches 22 interconnecting them and that the ramps 7a, 7b are diametrically opposite on the male termination 1 at the same axial height, like the lugs 21a, 21b that they are adapted to guide axially and constrain radially in the female termination 10.

Figure 2:
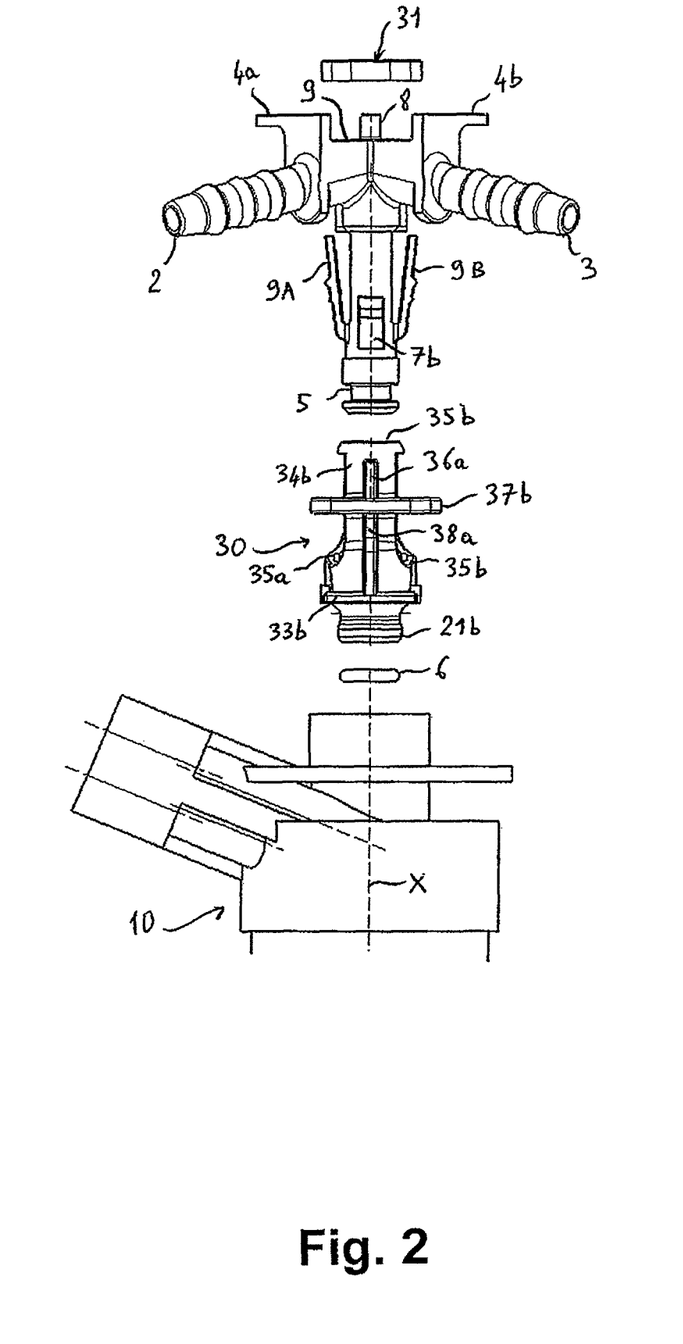
FIG. 2 is an exploded view in elevation of the device and the female termination from FIG. 1.
Figure 6:
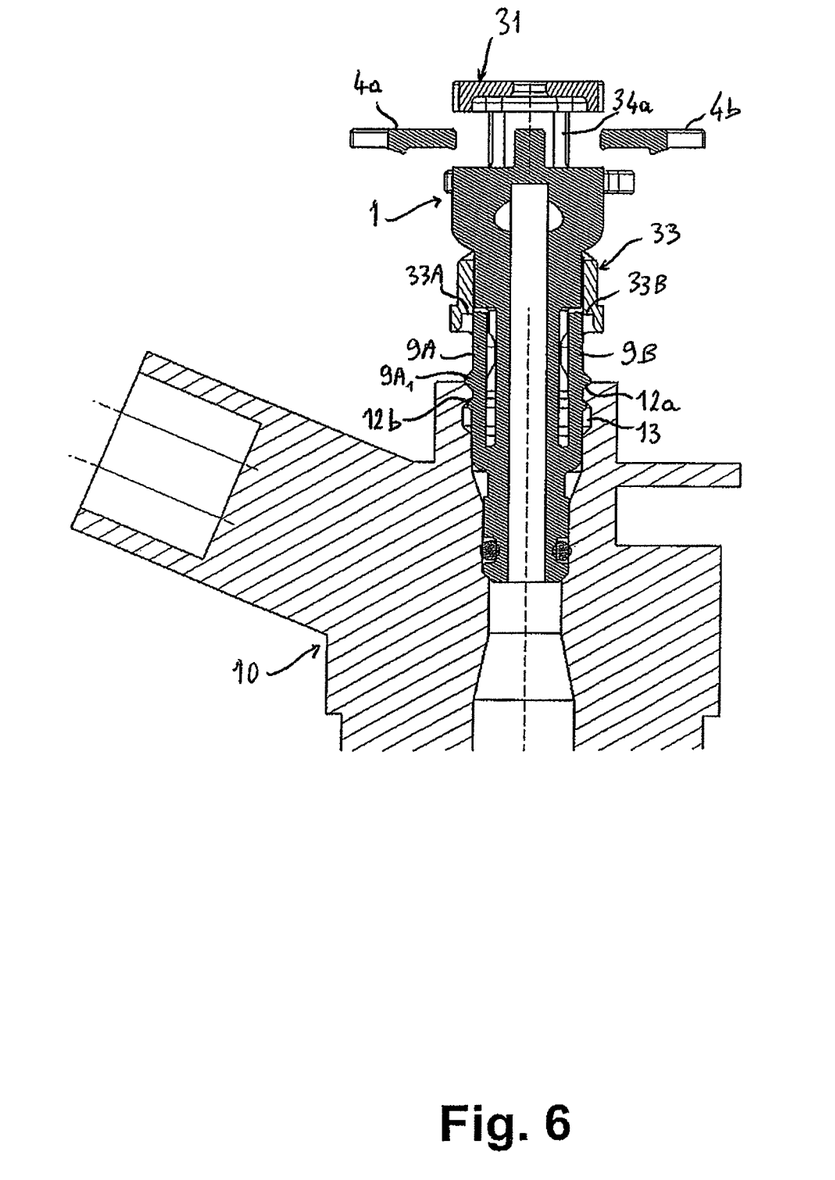
FIG. 6 is a view in axial section of the FIG. 5 device with the male termination completely inserted in the female termination and with its arms in a position releasing the locking member.

According to the present invention, the male termination 1 further includes two arms in the form of oblong blades 9A, 9B (i.e. they are flat and narrow compared to their length) that extend upward symmetrically to each other from a lower (i.e. axially internal) area of the termination 1 situated at substantially the same axial height as the ramps 7a, 7b, but offset angularly by 90° between two ramps 7a, 7b (this alternating arrangement of the ramps 7a, 7b and arms 9A, 9B on the circumference of the termination 1 and with the latter that arise at the same height as the ramps 7a, 7b is visible in FIGS. 1, 2 and 9). The arms 9A, 9B extend in a substantially axial direction, forming as it were a trident with the termination 1, and are adapted to occupy:

a position immobilizing the locking member 30 in which the respective free ends of the arms 9A, 9B serve as axial abutments for the member 30 via two internal shoulders 33A, 33B formed axially level with and between the half-flanges 33a, 33b and angularly offset 90° relative to the connecting lugs 21a, 21b (see FIGS. 1 and 4), in such a manner that the arms 9A, 9B form an acute angle α (FIG. 4) with the axis X of the termination 1 in this immobilizing position, and a position releasing the member 30, a prerequisite for reaching the locking position, in which the ends of the arms 9A, 9B are retracted radially toward the interior of the shoulders 33A, 33B only when the male termination is completely inserted in the female termination 10, because of contact between a boss on each arm 9A, 9B and the upper entry end 12 of the female termination 10, which occurs only at this degree of insertion, with the result that these arm ends no longer form axial abutments for the member 30 (this release position in which the arms 9A, 9B are bent parallel to the axis X of the termination 1 is shown in FIGS. 6, 7 and 9).

Figure 4:
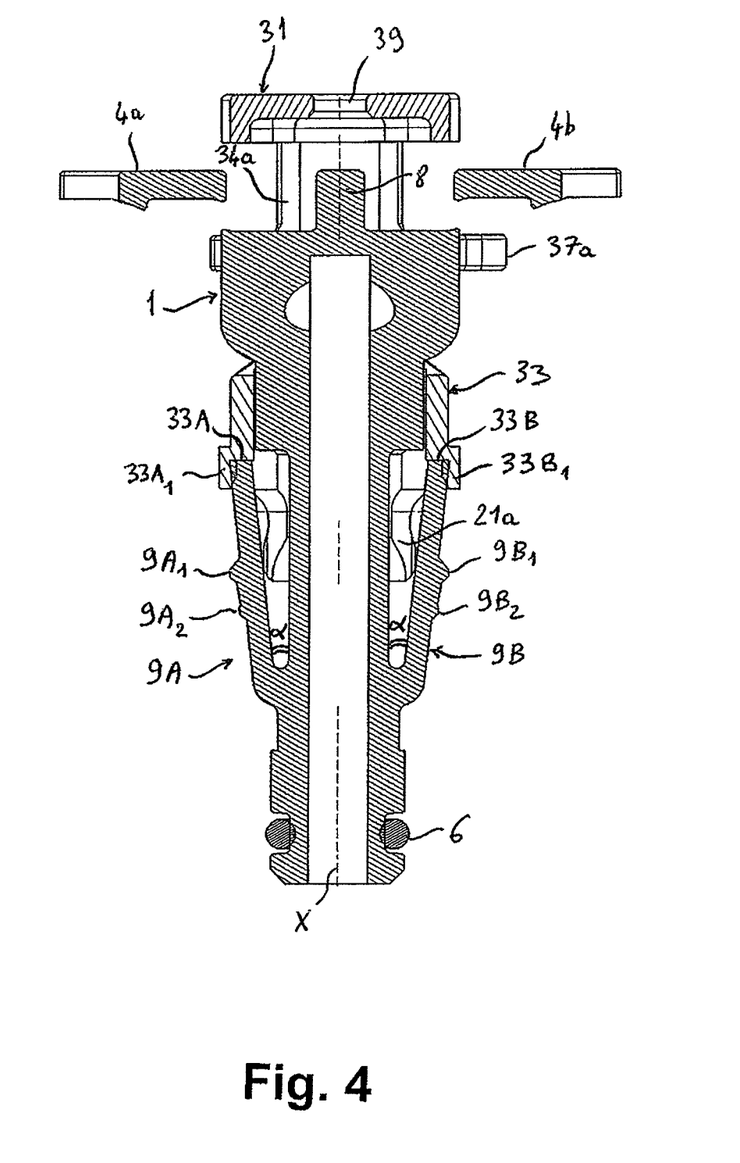
FIG. 4 is a detail view in axial section of the FIG. 3 device when assembled without the female termination receiving it in a position immobilizing the arms of the male termination on which the locking member abuts.

As may be seen in FIG. 4, it will be noted that the reliability of this immobilizing position, in which the arms 9A, 9B form abutments opposing axial sliding of the locking member 30, is advantageously reinforced by providing for each internal shoulder 33A, 33B a width in the radial direction at least equal to that of the end of each arm 9A, 9B to obtain a maximized area abutment radial interface. Moreover, each shoulder 33A, 33B terminates in a lower axial (i.e. vertical) rim 33A1, 33B1 that is perpendicular to this abutment radial interface and is adapted to be mounted in contact with the external face of the corresponding arm 9A, 9B in this immobilizing position.

Figure 5:
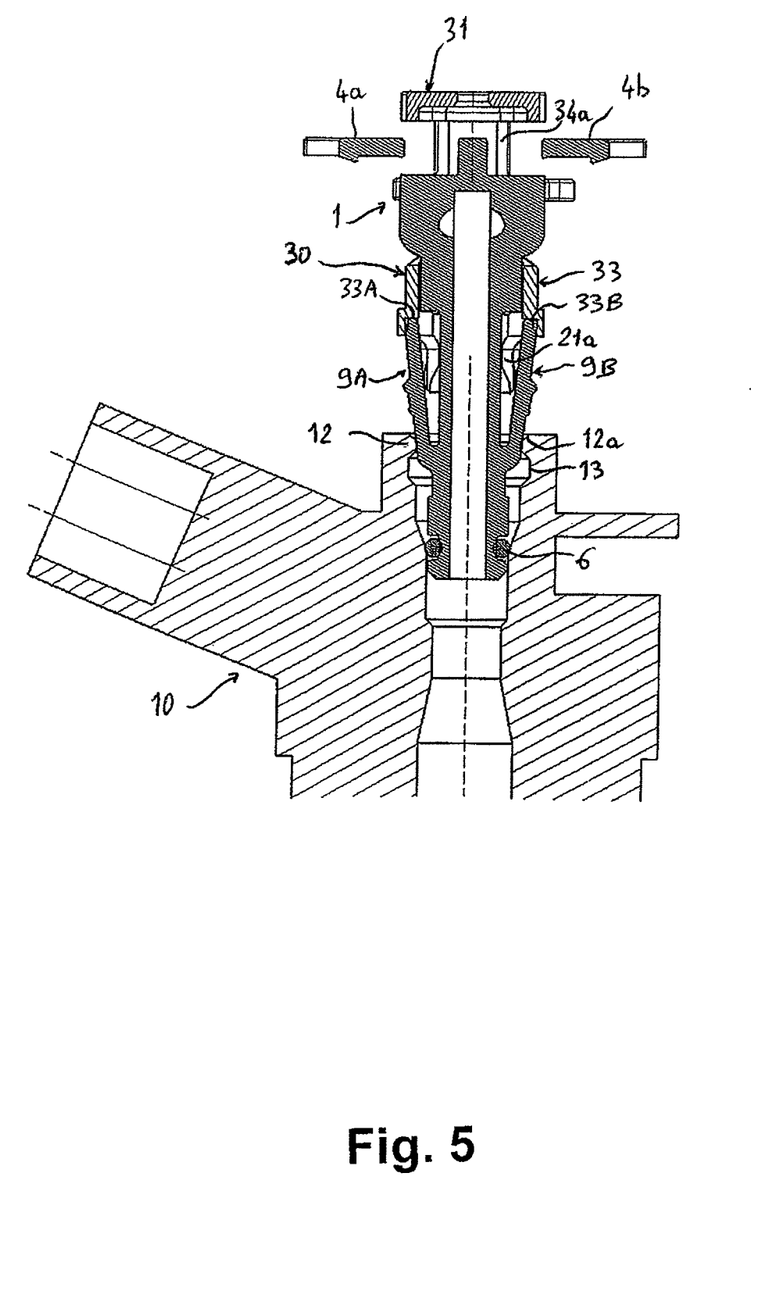
FIG. 5 is a view in axial section of the FIG. 4 device with the male termination partially inserted into the female termination from FIG. 3 and with its arms in this immobilizing position.

To be more precise, and as may be seen in FIGS. 4 to 6, each arm 9A, 9B has in a median area of its external face (i.e. that facing away from the axis X of the termination 1) the same boss which in this embodiment of the invention is formed of two protuberances 9A1, 9B1 and 9A2, 9B2 that are in the form of parallel ribs or teeth transverse to this arm 9A, 9B and which are interconnected by a surface projecting slightly outwards relative to the rest of the arm 9A, 9B. Each boss is designed to cooperate with by rubbing on an external (i.e. upper) chamfer 12a of the entry end 12 of the female termination 10 only when the male termination 1 is completely inserted in that termination 10, and it is notably each upper protuberance 9A1, 9B1 that in this embodiment projects furthest which, when it rubs against the oblique surface of the chamfer 12a, optimizes the bending of the arms 9A, 9B by causing them to bend parallel to the axis X of the termination 1 by tilting like a lever.

It will be noted that this location of the boss of each arm 9a, 9B with a view to its cooperation with the entry chamfer 12a enables some delay in the bending of each arm 9A, 9B following its contact with this chamfer 12a.

It will also be noted that in the retracted release position of the arms 9A, 9B the two protuberances 9A1, 9A2 and 9B1, 9B2 espouse the entry chamfer 12a and the exit chamfer 12b of the entry end 12 of the female termination 10 that they surround (see FIG. 6).

The rubbing of each boss on the entry end 12 of the female termination 10 advantageously has the effect of significantly increasing for the operator the force for inserting the male termination 1 in the female termination 10 and this rubbing may further generate a "click" audible to the operator, this increased force and/or this click indicating that the correct insertion position of the male termination 1 in the female termination 10 has been reached, thus inviting the operator at this precise moment to maneuver the locking member 30 by pushing it toward the female termination 10 to reach the locking position.

It will further be noted that the arms 9A, 9B also provide angular guidance for the termination 1 in translation in the female termination 10 to facilitate centering of the lugs 21a, 21b at the entry to the connecting groove 13.

As shown in FIGS. 5 to 9, the lugs 21a, 21b are locked in the groove 13 of the female termination 10 in the following manner:

a) the main body 33 of the member 30 is inserted around the male termination 1 from below after which the holding plate 31 is assembled to the body 33, in such a manner that the lugs 21a, 21b are disposed angularly facing the ramps 7a and 7b and on either side of the arms 9A, 9B and that this body 33 abuts axially via its internal shoulders 33A, 33B on these arms 9A, 9B, thus preventing downward movement of the lugs 21a, 21b (see FIG. 5), b) the male termination 1 is inserted completely into the female termination 10, which elastically deforms the arms 9A, 9B by bending them because of their boss rubbing against the entry chamfer 12a of the termination 10 with the result that the member 30 no longer abuts on these arms 9A and 9B radially retracted in this way toward the interior of the shoulders 33A, 33B, which allows downward sliding of the member 30 (see FIG. 6), after which c) the locking member is pushed downward (i.e. toward the female termination 10) to move the lugs 21a, 21b into the locking position inside the groove 13 of that termination 10 (see FIGS. 7 to 9).

It should be noted that in this locking position the internal shoulders 33A, 33B of the member 30 are outside the female termination 10 and that the two lugs 21a, 21b are immobilized by being bent against the groove 13 and against the associated guide and locking assistance ramps 7a, 7b.

To unlock the connecting device and demount it from the groove 13, upward traction is first applied to the locking member 30, with the male termination 1 held against the bottom of the female termination 10, so as to extract the lugs 21a, 21b therefrom, after which the male termination 1 is extracted from the female termination 10.

The invention claimed is:

1. Connection device for a fluid transfer line, in particular a low-pressure line, comprising:
   a tubular male termination,
   a connecting means distinct from and mounted around the male termination while being connected to a tubular female termination, this connecting means being configured to be accommodated in a connecting groove of the female termination, and
   a locking member for locking the connecting means in the female termination, this member including the connecting means and being configured to be mounted around the male termination to reversibly move the connecting means into a locking position in said groove,
   wherein the device comprises a pair of arms for immobilizing and releasing the locking member that are rigidly fastened to the male termination and are elastically deformable by bending in contact with an entry end of the female termination,
   said pair of arms being configured to prevent said connecting means from being moved to said locking position unless the male termination occupies a predetermined insertion position in the female termination, said predetermined insertion position being defined by a complete insertion of the male termination in the female termination, and
   said pair of arms being configured, only if the male termination has reached said insertion position, to release the locking member while allowing a movement of the locking member toward the female termination so that a thrust on this member moves said connecting means into said locking position.

2. Connecting device according to claim 1, wherein said pair of arms are retractable by elastic bending in the manner of lever arms in contact with said entry end of the female termination, said pair of arms being configured to occupy an immobilizing position in which the locking member abuts axially on said pair of arms which are deployed radially outward, and a release position in which this member is able to slide freely toward the female termination around said pair of arms that are retracted radially inward.

3. Connecting device according to claim 2, wherein said pair of arms are formed in one piece with the male termination that extend symmetrically to each other with respect to the axis (X) of the male termination from an axially internal area thereof, these arms, in said immobilizing position, being deployed on either side of this area at a same acute angle (α) and, in said release position, being bent parallel to the axis of the male termination.

4. Connecting device according to claim 3, wherein the locking member includes two internal rims or shoulders that are configured to abut on two free ends of said arms, respectively, deployed in their immobilizing position, and to lie radially outside the arms in said release position, these rims or shoulders being formed axially toward the exterior of an axially interior connecting end of said connecting means and being configured to lie axially outside the female termination in said locking position.

5. Connecting device according to claim 3, wherein each of said arms, of oblong blade shape, for example, has an external face relative to the male termination on which is formed at least one projecting protuberance configured to cooperate with said entry end of the female termination when the male termination occupies said insertion position, said at least one protuberance preferably being formed substantially at the mid-height of the corresponding arm.

6. Connection device according to claim 5, wherein each of said arms has at least two of said protuberances in the form of parallel transverse ribs that are configured to cause these arms to close to obtain its release position and furthermore to emit, by rubbing in contact with said entry end of the female termination, a noise informing an operator that said insertion position of the male termination has been reached and therefore that said connecting means can be locked in said groove.

7. Connection device according to claim 1, wherein said connecting means is formed in one piece with the locking member of which it forms an axially interior part, this connecting means including an axially interior connecting end comprising at least two connecting lugs elastically deformable in the radial direction extending axially inward and radially outward, the radially external and internal faces of each lug being able to be immobilized in said locking position by bending of each lug, respectively against said groove and against one of the corresponding guide and locking aid ramps of the male termination that are respectively associated with said lugs, said pair of arms being configured to cooperate with the locking member independently of said ramps and lugs.

8. Connection device to claim 7, wherein said arms are formed angularly between said ramps of which there are two and which are diametrically opposed for example, said at least one protuberance of each arm being formed axially outside each of the ramps, and wherein each of said arms, being of an oblong blade shape has an external face relative to the male termination on which is formed at least one projecting protuberance configured to cooperate with said entry end of the female termination when the male termination occupies said insertion position, said at least one protuberance being formed substantially at the mid-height of the corresponding arm.

9. Connection device according to claims 4, wherein said arms are formed angularly between said ramps of which there are two and which are diametrically opposed for example, said at least one protuberance of each arm being formed axially outside each of the ramps, and wherein each of said arms, being of an oblong blade shape has an external face relative to the male termination on which is formed at least one projecting protuberance configured to cooperate with said entry end of the female termination when the male termination occupies said insertion position, said at least one protuberance being formed substantially at the mid-height of the corresponding arm, and wherein the locking member has said internal rims or shoulders that are formed angularly between said connecting lugs and axially outside the latter, said lugs, of which there are two for example, each being of circular arc shape and the lugs being interconnected by as many notches configured to render these lugs sufficiently deformable in radial bending.

10. Connection device according to claim 1, wherein the locking member comprises holding means forming an axially exterior end of this member and having at least one radial plate configured to be pushed manually by an operator toward the female termination, this member cooperating with the male termination to give a visual indication that said locking position for said connecting means has been reached.

11. Connection device according to claim 10, wherein said holding means are constituted of a single radial thrust plate that is removably mounted on an axially exterior edge of the locking member and which, in said locking position, cooperates with an axial locking indicator pin extending between two bearing surfaces of the male termination so that this pin of the male termination is flush with the external face of said plate, which face is then axially level with and between these two bearing surfaces.

12. Fuel injector return circuit including a tubular male termination connected to a tubular female termination by a connection device, characterized in that this device is as defined in claim 1.

13. Method of mounting in a locking position and of demounting a connection device according to claim 11 in a tubular female termination to be connected to a male termination of the device, comprising the following successive mounting steps:

a) the connecting means and the locking member are positioned around the male termination in such a manner that the locking member abuts axially on said pair of arms, which prevents axially inward movement of the connecting means, b) the male termination is inserted into the female termination to connect it thereto in said predetermined insertion position, which elastically bends said pair of arms in contact with said entry end of the female termination so that the locking member no longer abuts on these means, which then allows axially inward movement of the connecting means, then c) an axially inward thrust (A) is exerted on the locking member to move the connecting means into said locking position inside said groove of the female termination, and in that, for demounting the device, axially outward traction is exerted on the locking member whilst holding the male termination against the bottom of the female termination so as to extract the connecting means therefrom, after which the male termination is extracted from the female termination.

14. Method according to claim 13, wherein the step a) two internal rims or shoulders of the locking member, which are formed axially toward the exterior of said connecting means, are caused to abut against respective free ends of said pair of arms, and then in that, in the step b), these arms are retracted by bending radially inward of the corresponding internal rims or shoulders to the contact of said entry end of the female termination, by rubbing at least one external protuberance situated substantially at mid-height of each arm against a chamfer of this entry end.

15. Method according to claim 14, wherein said locking position obtained after the step c), said internal rims or shoulders of the locking member are axially outside the female termination, and in that two diametrically opposite elastically deformable connecting lugs that form said connecting means are immobilized by bending against said groove and against two corresponding guide and locking aid ramps of the male termination that are respectively associated with said lugs, which are angularly situated on either side of said arms.

* * * * *

UNITED STATES PATENT AND TRADEMARK OFFICE
CERTIFICATE OF CORRECTION

| | | |
|---|---|---|
| PATENT NO. | : 8,777,275 B2 | Page 1 of 1 |
| APPLICATION NO. | : 13/418135 | |
| DATED | : July 15, 2014 | |
| INVENTOR(S) | : Ully et al. | |

It is certified that error appears in the above-identified patent and that said Letters Patent is hereby corrected as shown below:

Title page, Item (54) and in the Specification, Column 1, lines 1-3,
"FLUID TRANSFER CONNECTION DEVICE, CIRCUIT INCORPORATING IT AND ITS MOUNTING/DEMOUNTING" should read --FLUID TRANSFER CONNECTION DEVICE, CIRCUIT INCORPORATING IT AND ITS MOUNTING/DEMOUNTING METHOD--.

Signed and Sealed this
Eleventh Day of November, 2014

Michelle K. Lee
*Deputy Director of the United States Patent and Trademark Office*